United States Patent Office 3,167,438
Patented Jan. 26, 1965

3,167,438
CERAMIC ARTICLES AND METHODS OF MAKING
Robert H. Bristow, Ballston Lake, N.Y., assignor to General Electric Company, a corporation of New York
No Drawing. Filed Aug. 13, 1962, Ser. No. 216,345
7 Claims. (Cl. 106—46)

My invention relates to ceramic articles of the type usable as insulators in the manufacture of electric discharge devices. More particularly, it relates to new and improved high-alumina type ceramic bodies characterized by unusually low dielectric loss and to new and improved methods of manufacturing same.

In the manufacture of microwave frequency electric discharge devices and similar high frequency electric devices, it is desirable to employ low dielectric loss ceramics as envelope wall sections and electrode supports. Since it is generally recognized that dielectric loss in a high-alumina ceramic body decreases as the total alumina content of the body is increased, many manufacturers of alumina ceramics have heretofore sought improvements in dielectric properties of such ceramics by increasing the alumina content, and currently there are commercially available ceramics containing from 85% to 100% aluminum oxide and characterized by various low dielectric loss factors. In the electric discharge device manufacturing art, interest currently appears concentrated in those ceramic bodies containing from 94% to 99% alumina. In order to sinter alumina to a dense, vacuum-tight condition, which is generally required in the mentioned art, at commercially feasible temperatures, most manufacturers employ a small amount of some additive to promote sintering or vitrification. As a result, few ceramics are manufactured which contain greater than 99½% of aluminum oxide and these generally are characterized by power factors, for example, of 0.00010 or more measured at 10 kmc. There are available of course, several sources of pure, sintered alumina containing substantially 100% aluminum oxide. Some of these materials are characterized by high density and extreme low dielectric loss. One example of such a high density, extremely low loss material is commercially available under the trademark Lucalox. Lucalox material is disclosed and claimed in U.S. Patent No. 3,026,210 of R. L. Coble, issued March 20, 1962, entitled "Transparent Alumina and Method of Preparation," and is assigned to the same assignee as the present invention. This material has a power factor lower than 0.00003 measured at 10 kmc. However, the manufacture of such material involves the use of extremely pure raw materials, special processing such as firing in special controlled atmospheres, and very high sintering temperatures which generally require the use of special firing kilns, all of which result in selling prices making them prohibitively costly, or at least economically unattractive, for some applications.

My invention contemplates the provision of high-alumina ceramic bodies characterized by high density and mechanical strength and low dielectric losses comparable to those of the above-discussed substantially 100% aluminum oxide ceramics but which can be easily and inexpensively manufactured. Specifically, my invention contemplates the manufacture of dense, high mechanical strength high-alumina ceramic articles characterized by power factors lower than 0.00005 measured at 10 kmc. and which are manufacturable with substantially less than 100% aluminum oxide, with the use of generally commercial available raw materials instead of costly extremely pure ingredients, and by heat processing in air at relatively low temperature instead of in special atmospheres at substantially higher temperatures. In short, my invention affords the advantages of 100% aluminum oxide ceramic bodies with compositions that can comprise substantially less than 100% aluminum oxide and which can be processed without the attendant manufacturing difficulties and high costs usually associated with the manufacture of 100% aluminum oxide ceramic bodies.

Accordingly, a primary object of my invention is to provide new and improved low dielectric loss high-alumina ceramic bodies and new and improved methods for manufacturing same.

Another object of my invention is to provide new and improved high-alumina ceramic bodies and methods of making same which afford high density, high mechanical strength and low dielectric loss characteristics comparable to those obtainable with 100% alumina ceramics but which are substantially less expensive and relatively easy to manufacture.

Further objects and advantages of my invention will become apparent as the following description proceeds and the features of novelty which characterize my invention will be pointed out with particularity in the claims annexed to and forming part of this specification.

In carrying out the objects of my invention I provide ceramic bodies consisting of reaction products of at least about 94 weight percent aluminum oxide ($Al_2O_3$) and the remainder about equal weight percentages of fluxing oxides selected from the group consisting of silica ($SiO_2$), calcia (CaO) and magnesia (MgO) and including silica and calcia as essential ingredients. The ceramic batch compositions from which the bodies are formed are prepared from ingredients which are effective upon sintering to provide reaction products having the above-noted oxide compositions. Quantities of the batch compositions are formed into compressed specimens which are fired at temperatures and for periods effective to provide sintered ceramic articles vitrified to the extent that they are vacuum tight. Following such firing and in order to reduce the power factors of the articles, I heat them at temperatures and for periods effective to partially devitrify the articles. Thus, a finished article constitutes a reaction product of the alumina and fluxing ingredients wherein the alumina is in crystalline form and is bonded by a partially devitrified glass phase consisting of a reaction product of alumina and the remaining ingredients and the article is characterized by a power factor of less than about 0.00005 measured at a frequency of 10 kmc.

More specifically, and according to my invention, ceramic articles are formed of high alumina ceramic compositions including predetermined controlled amounts of the fluxing ingredients selected from the group consisting of $SiO_2$, CaO and MgO, and including $SiO_2$ and CaO as essential ingredients. These articles are heat treatable in air for effecting finished articles having desirable low loss properties comparable to those of articles consisting of 100% aluminum oxide.

The ceramic compositions of my improved ceramic articles preferably consist of alumina, silica, calcia and magnesia. The alumina constitutes between about 94 to 99, and preferably about 97, weight percent of the articles. The remainder of the articles consists of fluxing, or eutectic-forming oxides, sintering agents and grain growth controlling additives which are selected from the group consisting of silica, calcia, and magnesia. In this remaining portion silica and calcia are essential ingredients and in some compositions can be used to the exclusion of magnesia. However, preferably the remaining portion includes about equal weight percentages each of silica, calcia and magnesia. In the preferred forms the composition consists of by about 97 weight percent alumina and the remainder about 1 weight percent of each silica, calcia and magnesia or about 1.5 weight percent of silica and calcia and with no magnesia included.

According to my invention articles are formed, as by compression, of batch compositions including ingredients which when appropriately sintered provide ceramic bodies having the above-disclosed body compositions. These bodies can be formed to any desired configuration, such as cylindrical forms to be used as envelope wall sections in electric discharge devices. The bodies are matured or sintered by heating in air for approximately one hour at a firing temperature of approximately 1690° C. This results in the formation of sintered ceramic bodies vitrified to the extent that they are vacum tight and thus adapted for use, for example, as the above-mentioned envelope sections of evacuated electric discharge devices. Following this firing process the bodies are heated at a temperature of at least about 1200° C., and less than the firing temperature for at least one hour and up to about sixty hours. Expressed in another manner, the bodies are heated at a temperature of at least about 1200° C. and until the power factors thereof are reduced to less than about 0.00005 measured at 10 kmc. No special atmosphere is required for this heating step and, in fact, it can be conducted in air if desired. This latter heating step results in partial devitrification or recrystallization of the previously vitrified or amorphous portions of the bodies and is effective for reducing the power factors of the bodies by substantial amounts. Additionally, I have found that the power factors are lowered proportionally greater amounts with proportionally greater heating periods. However, I have also found that no appreciable further reductions in power factors are obtainable by heating the bodies for more than the above-indicated 60-hour period. Further, I have found that the mentioned desirable decreases in power factors are, with my above-disclosed body compositions and methods of manufacture, obtainable without undesired increases, or growth, in physical dimensions of the bodies. This latter property, namely, the capability of being heated without resultant increases in body dimensions, is highly desirable when, for example, the bodies are to be used as insulators in electric discharge devices. In such devices the insulators are ordinarily predeterminedly dimensioned in order to insure satisfactory sealing to metal elements and to provide for predetermined interelectrode spacings, and any appreciable changes in physical dimensions of the bodies when heated, as during sealing processes, can adversely affect the seals and the interelectrode spacings. Some commercially available high alumina ceramic bodies have been found to increase in dimensions as much as 1 mil per inch of diameter or length when subjected to temperatures in the range of from 1200° C. to 1400° C. Such dimension changes can introduce substantial problems, especially in connection with the making of strong vacuum-tight seals. My invention contemplates the provision of ceramics which avoid such problems.

Disclosed below in Table I are examples of ceramic body compositions manufactured and tested and including some falling within the purview of my invention:

Table I

| Body Number | Body Composition, weight percent | | | | |
| --- | --- | --- | --- | --- | --- |
| | $Al_2O_3$ | $SiO_2$ | CaO | MgO | BaO |
| 916 | 97.0 | 1.5 | | 1.5 | |
| 917 | 97.0 | 2.3 | | 0.7 | |
| 919 | 97.0 | 1.5 | 1.5 | | |
| 922 | 97.0 | 1.0 | 1.0 | 1.0 | |
| 923 | 97.0 | 2.2 | 0.4 | 0.4 | |
| 926 | 97.0 | 2.1 | 0.3 | 0.3 | 0.3 |

As seen in Table I, only two of the bodies, namely 919 and 922, satisfy the above-disclosed requirements of my invention. Specifically, all of the bodies contain 97 weight percent alumina and thus fall within the prescribed alumina content range of about 94 to 99 weight percent. However, only bodies 919 and 922 include the fluxing oxides in the prescribed proportions disclosed above and contain $SiO_2$ and CaO as essential oxides. The beneficial results from manufacturing ceramic bodies according to my invention and to include the above-mentioned prescribed fluxing oxides and proportions of fluxing oxides will be seen with the aid of Table II below in which are listed the bodies of Table I and related test data taken after the final heating step whereby the bodies are partly devitrified to reduce the power factors. This data shows comparatively the initial power factors of each body or, in other words, the power factors of each body measured at 10 kmc. before the heating step for reducing power factors has been performed. Also, Table II indicates comparatively the physical growth and power factor of each body after a post-firing heating step of one hour at 1300° C. and after additional 60-hour periods at 1200° C.

Table II

| Body No. | Initial Properties, 10 kmc. Power Factor | After 1 hour at 1,300° C. | | After an additional 60 hours at 1,200° C. | |
| --- | --- | --- | --- | --- | --- |
| | | Growth in Mils | 10 kmc. Power Factor | Growth in Mils | 10 kmc. Power Factor |
| 916 | 0.00025 | 0.0 | 0.00036 | 0.0 | 0.00024 |
| | 0.00025 | 0.0 | 0.00035 | 0.0 | |
| 917 | 0.00044 | 1.0 | 0.00024 | 0.1 | 0.00007 |
| | 0.00048 | 1.0 | | 0.1 | 0.00010 |
| 919 | 0.00047 | 0.0 | 0.00022 | 0.0 | 0.00004 |
| 922 | 0.00032 | 0.0 | 0.00011 | 0.0 | 0.00004 |
| | 0.00032 | 0.0 | 0.00009 | 0.0 | 0.00003 |
| 923 | 0.00042 | 0.6 | 0.00033 | 0.0 | 0.00038 |
| | 0.00039 | 0.6 | 0.00030 | 0.0 | 0.00027 |
| 926 | 0.00045 | 0.8 | 0.00026 | 0.3 | 0.00025 |
| | 0.00047 | 0.8 | 0.00031 | 0.3 | 0.00025 |

NOTE.—"Growth in Mils" based on a gage length of one inch.

As seen from Table II above, specimens formed to include the composition of the body designated 916 in Table I when tested after firing but before heat treatment showed a power factor of 0.00025 measured at 10 kmc. After the above-discussed heat treatment in air at 1300° C. and which lasted one hour these specimens did not show a growth but when again measured for power factors showed undesirable increases. After an additional 60 hours of heating at 1200° C. the 916 specimens still showed no growth. However, the power factor did not decrease appreciably below the initial power factor of 0.00025 and, specifically, in one case decreased to only 0.00024. In another case the power factor of a 916 specimen increased to 0.00035 after one hour heat treatment and therefore no measurement was taken after an additional 60-hour heating period inasmuch as there appeared to be no reason to expect that this specimen would react any differently from the first tested 916 body specimen.

The power factor of one 917 body specimen decreased from an initial figure of 0.00044 to 0.00024 after the one hour treatment and to 0.00007 after the 60-hour treatment. However, after the one hour treatment this body showed a growth of 1.0 mil and after the 60 hour treatment a growth of 0.1 mil which indicated that from the growth standpoint this body was generally unacceptable for electric discharge device applications. A second 917 body specimen showed no improvement over these findings.

As indicated in Table II, the 919 and 922 bodies showed no growth after either the one hour or the additional 60 hour heat treatments and were characterized by extraordinarily low power factors as compared with the initial power factors of the bodies measured during the manufacturing processes before the heat treatment steps. Specifically, the 919 body specimen showed an initial power factor of 0.00047 and two specimens of the body 922 showed initial power factors of 0.00032 each. After the 60 hours treatment the body specimen 919 showed no growth and a reduction in power factor to 0.00022 and after the additional 60 hour treatment at 1200° C. a power factor of only 0.00004, a reduction of an order of magnitude, and a power factor comparable to the above-discussed substantially 100% aluminum oxide ceramics such as Lucalox. Neither of the 922 body specimens showed growth after either the one hour or the sixty hour treatments. Additionally, the power factor of one of the 922 body specimens was reduced to 0.00011 after the one hour treatment and to 0.00004 after the 60 hour treatment and the power factor of the other 922 body specimen was reduced to 0.00009 after the one hour treatment and to only 0.00003 after the 60 hour treatment. Thus, the 922 body specimens also were characterized by power factors comparable to those of the previously discussed 100% aluminum oxide ceramic. Additionally, and as indicated in Table II, the 922 body specimens demonstrated a substantially greater reduction in power factor after only the one hour heat treatment and in view of this fact the 922 body composition is considered more easily reducible in power factor than the 919 body composition.

Some specimens formed of the body compositions designated 923 and 926 showed slight decreases in power factors after the one hour and 60 hour heat treatments. However, it can be seen from Table II that none of these approached the extraordinarily low power factors of bodies 919 and 922. Additionally, all of the specimens of the 923 and 926 bodies showed undesirable growth or increases in physical dimensions after the one hour heat treatment and the 926 body specimens showed additional growth after the 60 hour heat treatment.

Thus, when a ceramic body is manufactured to incorporate my prescribed ingredients and percentage compositions and according to my prescribed methods, the body is adapted for being vacuum tight and for resisting growth upon heating and, additionally, it is charcterized by extremely low power factors of less than 0.00005 and, thus, is adapted for extremely low dielectric losses. These bodies contain at least about 94% crystalline alumina bonded by either a partially devitrified glass phase consisting of a reaction product of $Al_2O_3$, $SiO_2$, CaO and MgO or a partially devitrified glass phase consisting of a reaction product of $Al_2O_3$, $SiO_2$, and CaO and are characterized by a power factor of less than 0.00005 measured at a frequency of 10 kmc., whereby such bodies are adapted for use in the same applications as the above-discussed more expensive and more difficult to manufacture 100% aluminum oxide ceramics. Additionally, bodies manufactured according to my invention are manufacturable with generally commercially available and inexpensive ingredients and without the use of special atmospheres or extraordinarily high temperatures which would require the use of special furnaces or kilns. Consequently, these ceramics are adapted for the same low dielectric loss properties as the 100% aluminum oxide ceramics and are no more costly to manufacture than the usual generally, available high-alumina ceramics which ordinarily are characterized by power factors at least an order of magnitude higher than my improved ceramics.

While most of the work leading up to the present invention has been carried out with compositions including about 97% aluminum oxide and 3% of the other three ingredients silica, calcia and magnesia in equal proportions, the desirable phenomena of extraordinarily reduced power factors and absence of the above-discussed type of body growth are known to be obtainable with bodies containing at least about 94 and up to about 99 weight percent $Al_2O_3$, provided the remainders of the body compositions consist of the oxides and in the proportions prescribed above. Additionally, and as brought out above, it is essential that the fluxing oxides include at least silica and calcia. Further, while in Table II the one hour heating step is shown as having been carried out at 1300° C., it is essential only that the various heating steps after firing and for partially devitrifying the previously vitrified ceramic bodies be carried out at temperatures of at least about 1200° C.

The following specific examples will illustrate in detail the manners in which ceramic bodies have been manufactured according to my invention and the body batch compositions employed in manufacturing my improved ceramic bodies:

*Body batch compositions*

[Weight Percent]

| Body No. | A-14 Alumina | Ultra Fine Silica | Magnesium Hydroxide | Calcium Carbonate |
|---|---|---|---|---|
| 919 | 95.8 | 1.48 | | 2.65 |
| 922 | 95.8 | 0.99 | 1.45 | 1.75 |

The above-noted A-14 Alumina was a commercially available low soda calcined aluminum oxide, the ultra fine silica was a commercially available finely ground silica, the magnesium hydroxide was of a commercially available grade designated grade #1211, and the calcium carbonate was of commercially available reagent grade.

In preparing each of the above-noted batch compositions the batch ingredients were weighed and charged into a ball mill with sufficient deionized water to effect a free-flowing slurry which was then ball milled for approximately 16 hours. During the milling an appropriate volatilizable organic binder was added to enhance green strength, or strength before maturation. The milled batches were spray dried to yield agglomerated particles suitable for the dry pressing of test specimens. All test specimens were formed at a pressure of 10 tons per square inch and were then matured in a gas fired kiln in an oxidizing atmosphere on a schedule which consisted of approximately twenty-one hours to peak temperature, one hour duration at peak temperature followed by cooling to room temperature in about twenty-four hours. The just-described procedure resulted in fired bodies having the oxide compositions indicated in Table I above and specimens of these bodies were subjected to the subsequent heat treatments indicated in Table II above.

Insulators made from the ceramic body compositions disclosed above and according to the methods disclosed above have excellent mechanical strength, are vacuum tight and are characterized by unusually low dielectric losses in high frequency applications. These properties and characteristics together with the relative ease and low cost with which the mentioned insulators are manufactureable, adapt them for wide application in the electronics field.

While I have described specific embodiments of my invention, I do not desire my invention to be limited to the particular forms described, and I intend by the appended claims to cover all modifications within the spirit and scope of my invention.

What I claim as new and desire to secure by Letters Patent of the United States is:

1. A ceramic body consisting of a reaction product of about 94 to 99 weight percent $Al_2O_3$ and the remainder about equal weight percentages of ingredients selected from the group consisting of $SiO_2$, CaO and MgO and wherein at least $SiO_2$, and CaO are essential ingredients in addition to said $Al_2O_3$, said $Al_2O_3$ being in crystalline form and bonded by a partially devitrified glass phase consisting of a reaction product of $Al_2O_3$ and the remaining ingredients, and said body being characterized by a power factor of less than 0.00005 measured at a frequency of 10 kmc.

2. A ceramic body consisting of a reaction product of about 97 weight percent $Al_2O_3$ and the remainder about 1 weight percent each of $SiO_2$, CaO and MgO, said $Al_2O_3$ being in crystalline form and bonded by a partially devitrified glass phase consisting of a reaction product of $Al_2O_3$, $SiO_2$, CaO and MgO and said body being characterized by a power factor of less than 0.00005 measured at a frequency of 10 kmc.

3. A ceramic body consisting of a reaction product of about 97 weight percent $Al_2O_3$ and the remainder about 1.5 weight percent each of $SiO_2$ and CaO, said $Al_2O_3$ being in crystalline form and bonded by a partially devitrified glass phase consisting of a reaction product of $Al_2O_3$, $SiO_2$, and CaO, and said body being characterized by a power factor of less than 0.00005 measured at a frequency of 10 kmc.

4. The method of manufacturing a low loss ceramic article consisting of the steps of providing a batch of ingredients effective upon sintering to provide a ceramic reaction product composition consisting of about 94 to 99 weight percent $Al_2O_3$ and the remainder consisting of about equal weight percentages of ingredients selected from the group consisting of $SiO_2$, CaO and MgO, and wherein at least $SiO_2$ and CaO are included as essential ingredients, firing said batch at a firing temperature for a period of time effective to provide a ceramic body vitrified to the extent that it is vacuum tight, and after firing reducing the power factor of the fired body by heating said body at a temperature which is less than said firing temperature but above 1200° C. and for a period of time effective to partially devitrify the amorphous phase formed in said fired body.

5. The method of manufacturing a low loss ceramic article consisting of the steps of providing a batch of ingredients effective upon sintering to provide a ceramic reaction product composition consisting of about 94 to 99 weight percent $Al_2O_3$ and the remainder about equal weight percentages of oxides selected from the group consisting of $SiO_2$, CaO and MgO and wherein at least $SiO_2$ and CaO are included as essential ingredients, firing said batch at a firing temperature of about 1690° C. for a period of about one hour to provide a vitrified vacuum tight ceramic body, and after firing reducing the power factor of the fired body by heating said body at a temperature of at least about 1200° C. and less than about 1690° C. to partially devitrify the amorphous phase formed in said fired body and until said power factor is reduced to less than about 0.00005 measured at 10 kmc.

6. The method of manufacturing a low loss ceramic article consisting of the steps of providing a batch of ingredients effective upon sintering to provide a ceramic reaction product composition consisting of about 97 weight percent $Al_2O_3$ and the remainder about 1 percent each of $SiO_2$, CaO and MgO, firing said batch at a firing temperature and for a time period effective to provide a vitrified vacuum tight ceramic body, and after firing reducing the power factor of the fired body by heating said body at a temperature of at least about 1200° C. and less than said firing temperature for a period of at least about 1 hour and up to about 60 hours to partially devitrify the amorphous phase formed in said fired body.

7. The method of manufacturing a low loss ceramic article consisting of the steps of providing a batch of ingredients effective upon sintering to provide a ceramic reaction product composition consisting of about 97 weight percent $Al_2O_3$ and the remainder about equal weight percentages of $SiO_2$ and CaO, firing said batch at a firing temperature for a period of time effective to provide a vitrified vacuum tight ceramic body, and after firing reducing the power factor of the fired body by heating said body at a temperature of at least about 1200° C. and less than said firing temperature for a period of at least about 1 hour and up to about 60 hours to partially devitrify the amorphous phase formed in said fired body.

References Cited by the Examiner

UNITED STATES PATENTS

| | | | |
|---|---|---|---|
| 2,760,875 | 8/56 | Schwartzwalder et al. | 106—46 |
| 2,887,394 | 5/59 | Bickford et al. | 106—46 |

FOREIGN PATENTS 802,564  10/58  Great Britain.

OTHER REFERENCES

Navias: J. Am. Cer. Soc., volume 37 (1945), "Advances in Ceramics Related to Electronic Tube Developments" (pages 329–350).

Smothers et al.: J. Am. Cer. Soc., volume 37 (1954), "Sintering and Grain Growth of Alumina" (pages 588–595).

Cahoon et al.: J. Am. Cer. Soc., volume 39 (1956), "Sintering and Grain Growth of Alpha-Alumina" (pages 342–343).

Floyd: Bull. Cer. Soc., February 1963, "Effect of Composition and Crystal Size of Alumina Ceramics on Metal-to-Ceramic Bond Strength" (presented May 1, 1962, Annual Mtg. Am. Cer. Soc.) (pages 65–70).

TOBIAS E. LEVOW, *Primary Examiner.*